United States Patent
Liao et al.

(10) Patent No.: US 10,540,000 B2
(45) Date of Patent: *Jan. 21, 2020

(54) DYNAMIC VOLTAGE CONTROL

(71) Applicant: International Business Machines Corporation, Armonk, NY (US)

(72) Inventors: Mengze Liao, Shanghai (CN); Yang Liu, Shanghai (CN); Geng Tian, Shanghai (CN); Xing Zhao, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/819,491

(22) Filed: Nov. 21, 2017

(65) Prior Publication Data

US 2018/0341319 A1 Nov. 29, 2018

Related U.S. Application Data

(63) Continuation of application No. 15/604,733, filed on May 25, 2017.

(51) Int. Cl.
| | | |
|---|---|---|
| *G06F 9/00* | (2006.01) | |
| *G06F 1/3296* | (2019.01) | |
| *G06F 1/3287* | (2019.01) | |

(52) U.S. Cl.
CPC .......... *G06F 1/3296* (2013.01); *G06F 1/3287* (2013.01)

(58) Field of Classification Search
CPC .............................. G06F 1/3296; G06F 1/3287

USPC ........ 323/371, 288, 283, 234; 713/300, 320, 713/340
See application file for complete search history.

(56) References Cited

U.S. PATENT DOCUMENTS

| | | | |
|---|---|---|---|
| 6,697,952 B1 | 2/2004 | King | |
| 7,852,053 B2 | 12/2010 | Martin et al. | |
| 7,913,099 B2* | 3/2011 | Zagacki | G06F 1/32 323/371 |
| 8,330,444 B2 | 12/2012 | Noon et al. | |
| 8,615,670 B2 | 12/2013 | Feng et al. | |
| 2004/0133813 A1 | 7/2004 | Burnham et al. | |
| 2006/0085660 A1 | 4/2006 | Zagacki | |
| 2006/0181258 A1 | 8/2006 | Benbrik | |
| 2007/0271473 A1* | 11/2007 | Hosomi | G06F 1/3203 713/300 |

(Continued)

FOREIGN PATENT DOCUMENTS

CN 102299628 A 12/2011

OTHER PUBLICATIONS

Prophet, Graham, "Precision VID regulator supplies FPGAs, ASICs & processors at up to 300A", Aug. 20, 2015, eeDesign, Europe, pcim, Europe, International Exhibition and Conference, 4 pages.

(Continued)

*Primary Examiner* — Aurel Prifti
(74) *Attorney, Agent, or Firm* — Edward J. Wixted, III (57) ABSTRACT

In an approach for controlling voltage, a computer obtains a magnitude of a current of a processing unit. The computer determines an optimized magnitude of a voltage based on the obtained magnitude of the current. The computer generates an updating instruction based on the determined optimized magnitude of the voltage. The computer supplies the generated updating instruction to the processing unit.

6 Claims, 5 Drawing Sheets

(56) References Cited

U.S. PATENT DOCUMENTS

| | | | |
|---|---|---|---|
| 2009/0077402 A1* | 3/2009 | Huang | G06F 1/3203 |
| | | | 713/320 |
| 2009/0167282 A1 | 7/2009 | Koertzen et al. | |
| 2010/0033153 A1* | 2/2010 | Xing | H02M 3/156 |
| | | | 323/288 |
| 2012/0054515 A1* | 3/2012 | Naffziger | G06F 1/3203 |
| | | | 713/320 |
| 2012/0229104 A1* | 9/2012 | Pierson | H02M 1/32 |
| | | | 323/234 |
| 2013/0086396 A1 | 4/2013 | Liu | |
| 2014/0002047 A1* | 1/2014 | Houston | H02M 3/156 |
| | | | 323/283 |
| 2014/0223205 A1 | 8/2014 | Muthukaruppan et al. | |
| 2015/0185797 A1* | 7/2015 | Cooper | G06F 1/28 |
| | | | 713/340 |
| 2017/0115725 A1* | 4/2017 | Luo | G06F 1/3296 |
| 2017/0255251 A1 | 9/2017 | Zhang et al. | |

OTHER PUBLICATIONS

Liao et al., "Dynamic Voltage Control", U.S. Appl. No. 15/604,733, filed May 25, 2017, 40 pages.
Appendix P, List of IBM Patents or Patent Applications Treated as Related, 2 pages, dated Nov. 27, 2017.
Appendix P, List of IBM Patents or Patent Applications Treated as Related, 2 pages, dated Jan. 9, 2018.
Liao et al., "Dynamic Voltage Control", U.S. Appl. No. 15/848,161, filed Dec. 20, 2017, 35 pages.
Liao et al, "Dynamic Voltage Control ", U.S. Appl. No. 16/387,703, filed Apr. 18, 2019, 35 pages.
IBM Appendix P, list of patents and patent applications treated as related, Filed Herewith, 2 pages.

* cited by examiner

DYNAMIC VOLTAGE CONTROL

BACKGROUND

The present disclosure generally relates to voltage control. Specifically, the present disclosure relates to dynamic voltage control for a processing unit.

Electronic devices consume electric energy to generate desired output (i.e., light, heat, motion, etc.). Electric energy consumption is the actual energy demand made on an existing electricity supply. Voltage droop is an intentional loss in output voltage from a device as the output voltage drives a load. Employing droop in a voltage regulation circuit (e.g., voltage regulator) increases the headroom for load transients (i.e., short-lived bursts of energy in a system caused by a sudden change of state). The voltage regulator is designed to automatically maintain a constant voltage level (e.g., maintains a fixed voltage independent of the load resistance of the output current). Between the regulator output and the load is a series resistor. The resistance of the resistor is chosen such that at maximum output current, the output voltage at the load is the minimum acceptable. Conversely, when the output current is near and/or equal to zero, the voltage is near the maximum. This follows simply from Ohm's law as voltage equals current multiplied by resistance ($V=I*R$), and a calculation of power as voltage multiplied by current ($W=V*I$).

Voltage/current regulators can be made from a resistor in series with a diode and/or a series of diodes). Due to the logarithmic shape of diode V-I curves, the voltage across the diode changes only slightly due to changes in current drawn or changes in the input. Feedback voltage regulators operate by comparing the actual output voltage to some fixed reference voltage. Any difference is amplified and used to control the regulation element in such a way as to reduce the voltage error through a negative feedback control loop. If the output voltage is too low the regulation element is commanded to produce a higher output voltage—by dropping less of the input voltage (e.g., linear series regulators, buck switching regulators, etc.), or to draw input current for longer periods (e.g., boost-type switching regulators). If the output voltage is too high, the regulation element is commanded to produce a lower voltage.

SUMMARY

Aspects of the present invention disclose a method, computer program product, and system for controlling voltage, the method comprises one or more computer processors obtaining a magnitude of a current of a processing unit. The method further comprises one or more computer processors determining an optimized magnitude of a voltage based on the obtained magnitude of the current. The method further comprises one or more computer processors generating an updating instruction based on the determined optimized magnitude of the voltage. The method further comprises one or more computer processors supplying the generated updating instruction to the processing unit.

It is to be understood that the Summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Throughout the drawings, same or similar reference numerals represent the same or similar elements.

DETAILED DESCRIPTION

Power consumption of a computing system is critical in the computing industry. In the computing system, a processing unit such as a Central Processing Unit (CPU) is a main power consumer. In order to keep the processing unit operating at a desired voltage, voltage control instructions are sent to a voltage regulating unit, and then the regulating unit outputs a corresponding voltage based on a predefined rule to the processing unit. However, the output voltage is related to a magnitude of a current of the processing unit. As recognized by embodiments of the present invention, the magnitude of the output voltage may be higher than the required voltage to maintain proper function under some situations, which results in unnecessary power consumption in the computing system. For example, the processing unit does not always run at a maximum workload with a maximum current, and therefore receives a higher voltage and higher current than needed to ensure correct operation. As recognized by embodiments of the present invention, due to the excess voltage and current (e.g., excess power), the processing unit wastes the excess power in instances in which the workload is light.

Embodiments of the present invention control the voltage supplied to the processing unit more effectively to reduce power consumption (e.g., save power). Embodiments of the present invention provide a method to accurately control a power supply for a processing unit dynamically to adjust for variations as variations in the workload occur. Embodiments of the present invention create a dynamic voltage instruction (VID) and track the current dynamically in order to dynamically adjust the VID and fine turn the voltage of the processing unit in order to save power.

Principle of the present disclosure will now be described with reference to some example implementations. It is to be understood that these implementations are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one implementation" and "an implementation" are to be read as "at least one implementation." The term "another implementation" is to be read as "at least one other implementation." Other definitions, explicit and implicit, may be included below.

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
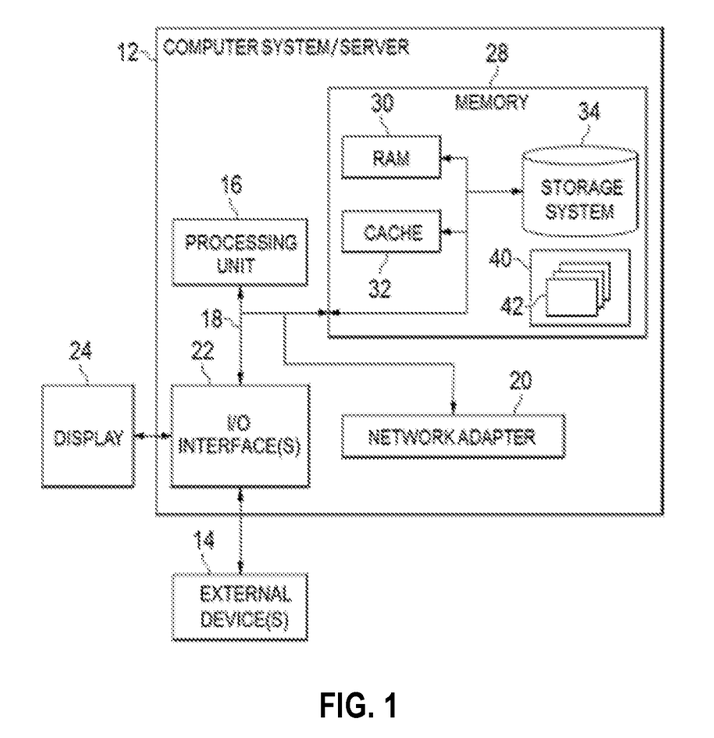
FIG. 1 is a block diagram of components of the computer system/server, in accordance with an embodiment of the present invention.

Referring now to FIG. 1, in which depicts a block diagram of components of computer system/server 12 which is applicable to implement the implementations of the present disclosure is shown. Computer system/server 12 is only illustrative and is not intended to suggest any limitation as to the scope of use or functionality of implementations of the disclosure described herein. It should be appreciated that FIG. 1 provides only an illustration of one implementation and does not imply any limitations with regard to the environments in which different embodiments may be implemented. Many modifications to the depicted environment may be made.

As shown in FIG. 1, computer system/server 12 is shown in the form of a general-purpose computing device. The components of computer system/server 12 may include, but are not limited to, one or more processors 16 or processing devices, a system memory 28, and a bus 18 that couples various system components including system memory 28 to processing unit(s) 16.

Computer system/server 12 includes bus 18, which provides communications between cache 32, system memory 28, storage system 34, network adapter 20, and input/output (I/O) interface(s) 22. Bus 18 can be implemented with any architecture designed for passing data and/or control information between processors (such as microprocessors, communications and network processors, etc.), system memory, peripheral devices, and any other hardware components within a system. For example, bus 18 can be implemented with one or more buses or a crossbar switch.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of implementations of the disclosure.

System memory 28 and storage system 34 are computer readable storage media. In this embodiment, system memory 28 includes random access memory (RAM) 30. In general, system memory 28 can include any suitable volatile or non-volatile computer readable storage media. Cache 32 is a fast memory that enhances the performance of processing unit(s) 16 by holding recently accessed data, and data near accessed data, from system memory 28.

Implementations of the disclosure may be stored in storage system 34 and in system memory 28 for execution and/or access by one or more of the respective processing unit(s) 16 via cache 32. In an embodiment, storage system 34 includes a magnetic hard disk drive. Alternatively, or in addition to a magnetic hard disk drive, storage system 34 can include a solid-state hard drive, a semiconductor storage device, a read-only memory (ROM), an erasable programmable read-only memory (EPROM), a flash memory, or any other computer readable storage media that is capable of storing program instructions or digital information.

The media used by storage system 34 may also be removable. For example, a removable hard drive may be used for storage system 34. Other examples include optical and magnetic disks, thumb drives, and smart cards that are inserted into a drive for transfer onto another computer readable storage medium that is also part of persistent storage system 34.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of implementations of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. Network adapter 20, in these examples, provides for communications with other data processing systems or devices. In these examples, network adapter 20 includes one or more network interface cards. Network adapter 20 may provide communications through the use of either or both physical and wireless communications links. As depicted, network adapter 20 communicates with the other components of computer system/server 12 via bus 18. Implementations of the disclosure may be downloaded to storage system 34 through network adapter 20. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

I/O interface(s) 22 allows for input and output of data with other devices that may be connected to computer system/server 12. For example, I/O interface(s) 22 may provide a connection to external device(s) 14, such as a keyboard, a keypad, a touch screen, and/or some other suitable input device. External devices 14 can also include portable computer readable storage media such as, for example, thumb drives, portable optical or magnetic disks, and memory cards. Software and data used to practice embodiments of the present invention, can be stored on such portable computer readable storage media and can be loaded onto storage system 34 via I/O interface(s) 22. I/O interface(s) 22 also connect to a display 24.

Display 24 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is appreciated that computer system/server 12 as illustrated in FIG. 1 is only an example of the computing device in which the implementations of the present disclosure may be implemented. In one implementation, the data nodes in the distributed processing system and the distributed storage system may have similar configuration of computer system/server 12. Processing unit(s) 16 may include one or more processing units. In order to keep processing unit(s) 16 (e.g., processing unit 210) running at a target state with a predefined voltage (for example, defined by a PSTATE VID instruction), computer system/server 12 needs to send an instruction to a regulating unit (e.g., regulating unit 220) for controlling the magnitude of the voltage that is outputted to processing unit(s) 16. Regulating unit 220 outputs voltage that correlates to P-State voltage identification (PSTATE VID) to satisfy the PSTATE voltage required by processing unit 210. The voltage identification (VID) is fixed for each PSTATE voltage. VID is calculated as the PSTATE voltage+max current*load line of regulating unit 220. The PSTATE VID instruction may include voltage-frequency pair parameters that set the speed and power consumption of processing unit(s) 16. The PSTATE pair may describe the working state of processing unit(s) 16 by a corresponding voltage and frequency. During operation as the operating voltage lowers, the power consumption also reduces. In addition, the frequency of processing unit(s) 16 lowers in tandem (e.g. along) with the voltage, which thereby results in slower computations.

Figure 2:
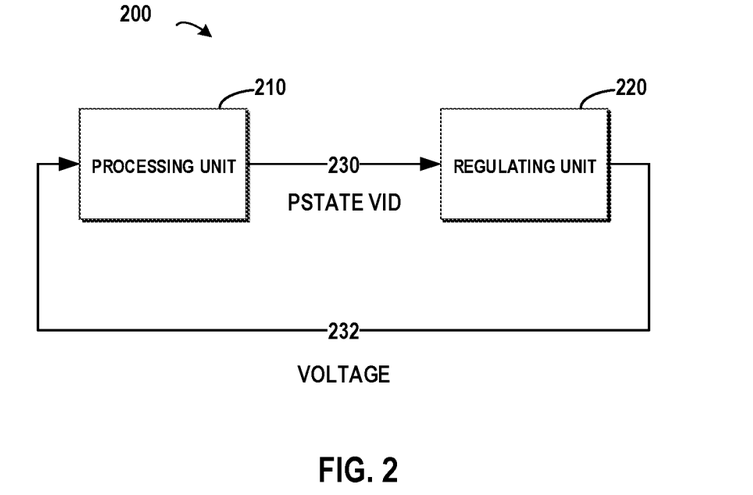
FIG. 2 schematically illustrates an example block diagram of a typical voltage control system, in accordance with an embodiment of the present invention.

FIG. 2 schematically illustrates an example diagram block of voltage control system 200 according to one embodiment of the present invention. In FIG. 2, voltage control system 200 includes processing unit 210 and regulating unit 220, that is driven by voltage 232. Regulating unit 220 receives a voltage control instruction such as PSTATE VID 230 from processing unit 210. Further, regulating unit 220 outputs voltage 232 based on PSTATE VID 230 to satisfy the requirement of processing unit 210.

Processing unit 210 is the electronic circuitry within a computer that carries out the instructions of a computer program by performing the basic arithmetic, logical, control and input/output (I/O) operations specified by the instructions. The amount of power processing unit 210 utilizes is a product of voltage 232 and a current, which processing unit 210 draws.

Regulating unit 220 is a voltage regulator that maintains a constant voltage level that is supplied to processing unit 210 as voltage 232. In one embodiment, regulating unit 220 is a separate voltage regulator. In another embodiment, regulating unit 220 is a voltage regulator included within a power supply which stabilizes voltage 232 utilized by processing unit 210 and other elements (not shown) based on PSTATE VID 230. PSTATE VID 230 is a voltage control instruction that includes voltage-frequency pair parameters that set the speed and power consumption of processing unit 210.

During the operation of processing unit 210, the voltage (e.g., voltage 232) of processing unit 210 may decrease with the increase of the current of processing unit 210. The relationship between the voltage and the current is called a load line function. In a graphical analysis of an electronic circuit, the load line is used to represent constraints placed on the electrical circuit. For example, the load line is depicted by a straight line, which represents the response of the linear part of the electronic circuit as a current versus a voltage. In order to maintain normal operation of processing unit 210, the minimum voltage, which corresponds to a maximum current, should be higher than or equal to the PSTATE voltage. During operation, processing unit 210 is not always running at a maximum current, and therefore when the magnitude of the current is lower than the maximum current, voltage 232 that is output from regulating unit 220 is higher than the PSTATE voltage. As voltage 232 is higher than the PSTATE voltage, power may be wasted by processing unit 210 (e.g., excess voltage). In other words, when the workload of processing unit 210 is light, a lower current results, and processing unit 210 is supplied with a voltage higher than the PSTATE voltage.

Figure 3:
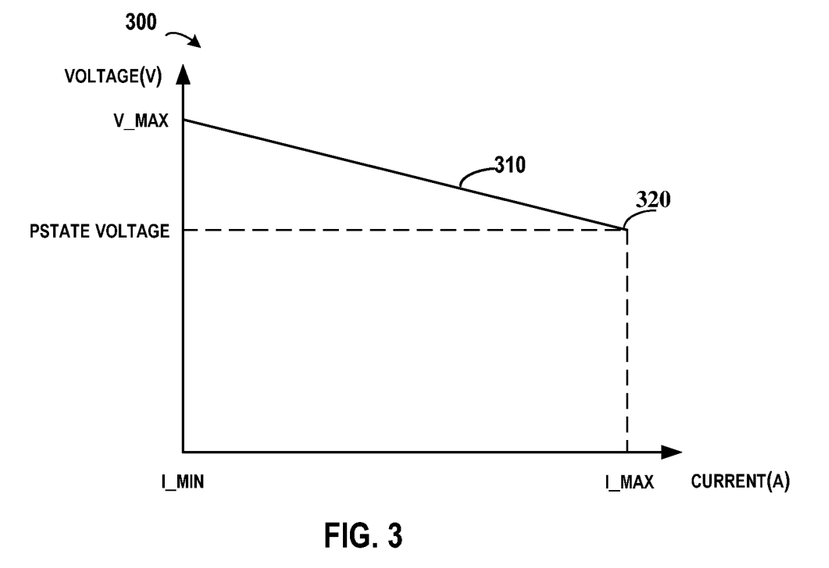
FIG. 3 schematically illustrates an example curve of a relationship between a voltage that is supplied to the processing unit and a current of the processing unit, in accordance with an embodiment of the present invention.

FIG. 3 schematically illustrates an example of voltage current relationship 300. Line 310 depicts a relationship between voltage 232 supplied to processing unit 210 and a current of processing unit 210 according to one embodiment of the present disclosure (e.g., load line). In FIG. 3, the horizontal axis (e.g. x-axis) indicates a magnitude of a current (e.g., Current (A)) of processing unit 210 from I_MIN (e.g., minimum current, wherein "I" stands for current) to I_MAX (e.g., maximum current, wherein "I" stands for current). The vertical axis (e.g., y-axis) indicates a magnitude of a voltage (e.g., VOLTAGE (V)) up to V_MAX of processing unit 210. As depicted, voltage 232 obtained at a maximum current (I_MAX) at point 320 (e.g., intersection of PSTATE VOLTAGE, I_MAX, and line 310)

is a desired voltage (PSTATE voltage) that is associated with a working state defined by the PSTATE VID instruction (e.g., PSTATE VID 230).

During the operation of processing unit 210, voltage 232 of processing unit 210 may be inversely proportional to the current according to the load line function. For example, line 310 depicts voltage 232 of processing unit 210 as reaching the maximum magnitude of V_MAX when the current reaches the minimum magnitude of I_MIN. According to FIG. 3, when the current of processing unit 210 is lower than I_MAX, voltage 232 may be higher than what is required for maintaining the normal operation of processing unit 210. In instances of voltage control system 200 in which voltage 232 is higher than the voltage (e.g., PSTATE voltage) required to maintain normal operation, implementations of the present disclosure provide a method and a system for dynamically controlling voltage 232 supplied to processing unit 210.

Figure 4:
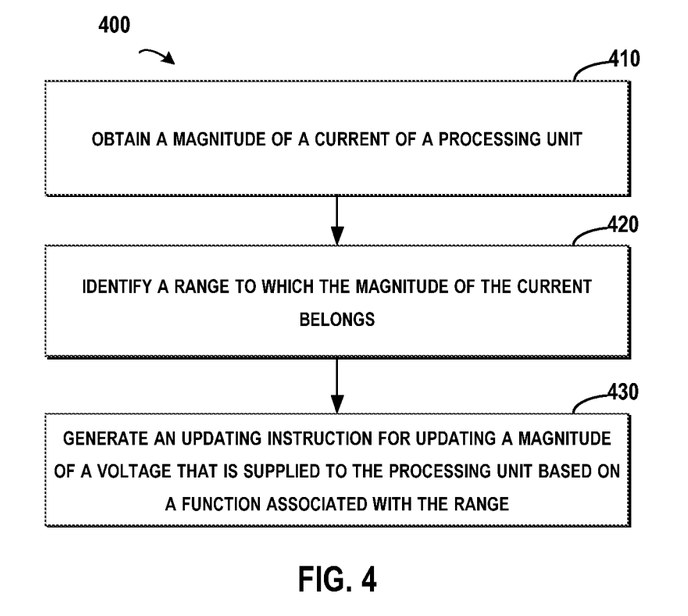
FIG. 4 schematically illustrates an example flowchart of a method for generating an updating instruction for updating a magnitude of a voltage that is supplied to the processing unit, in accordance with an embodiment of the present invention.

In view of the above, one implementation of the present disclosure proposes computer-implemented method 400, which creates a new hardware and software voltage identification (VID) update engine structure. Computer-implement method 400 obtains a magnitude of a current of processing unit 210. Computer-implemented method 400 determines an optimized magnitude of voltage 232 according to the magnitude of the current. Computer-implemented method 400 generates an updating instruction for supplying the optimized magnitude of voltage 232 to processing unit 210 based the equation in which VID=PSTATE voltage+ max current*load line. With the above implementation, computer-implemented method 400 may also dynamically generate the updating instruction according to the decreased magnitude of the current of processing unit 210, such that the voltage of voltage 232 that exceeds the desired working voltage (e.g., target state) may be decreased to a reasonable magnitude in order to enable a power saving mode. Computer-implemented method 400 dynamically generates the updating instruction by replacing the maximum current in the aforementioned equation with the dynamic current (i.e., incorporates changes to the updating instruction as changes to the current occur). Dynamic current is a current in which the value of the current changes over time (i.e., not a steady fixed value). For example, as the electrical load or portion of a circuit that consumes power fluctuates (e.g., varies), the actual required voltage and current required to maintain operation of voltage control system 200 raises and lowers in response to the demand.

FIG. 4 schematically illustrates an example flowchart of computer-implemented method 400 for generating an updating instruction for updating a magnitude of voltage 232 that is supplied to processing unit 210 according to one implementation of the present disclosure. According to the illustration of FIG. 4, computer-implemented method 400 obtains a magnitude of a current of processing unit 210 at step 410. As the magnitude of the current may vary during the operation of processing unit 210, computer-implemented method 400 monitors (e.g., measures the current) the magnitude of the current in real time and/or at a predefined time interval (such as 1 second or another interval).

Computer-implemented method 400 determines an optimized magnitude of voltage 232 according to the magnitude of the current at step 420. Computer-implemented method 400 generates an updating instruction for supplying the optimized magnitude of voltage 232 to processing unit 210 at step 430. With the implementations, computer-implemented method 400 optimizes voltage 232 that exceeds the desired working voltage to a reasonable magnitude (e.g., minimum voltage that allows proper operation, percentage reduction of the exceeding voltage, set percentage above PSTATE Voltage, analysis of actual high and low power draws during operation, etc.) that thereby enables a power saving mode.

In some implementations of the present disclosure, computer-implemented method 400 determines a range to which the magnitude of the current belongs. Furthermore in some implementations, computer-implemented method 400 determines a function associated with the range and determines the optimized magnitude of voltage 232 according to the function. In one implementation, computer-implemented method 400 identifies the range to a predefined extent, which computer-implemented method 400 obtains by dividing the full coverage of the potential magnitudes of the currents of processing unit 210 by a number of segments (e.g., predefined, user selected). In one example, the full coverage may be defined between the minimum value I_MIN and the maximum value I_MAX (e.g., minimum current to maximum current). The full coverage may be divided into several segments (for example, 4 segments), and each of the segments may represent one range.

Furthermore, computer-implemented method 400 generates an updating instruction for supplying the optimized magnitude of voltage 232 to processing unit 210 based on the optimized magnitude of voltage 232 (e.g., iterative process). Referring back to FIG. 2, voltage 232 output by regulating unit 220 may be controlled by the updating instruction based on line 310 within FIG. 3, such that voltage 232 that is to be supplied to processing unit 210 may be decreased according to a function (e.g., line 310) associated with the range to which the magnitude of the current of processing unit 210 belongs. Further, the optimized magnitude may be determined according to the function and thus the updating instruction may be generated based on the optimized magnitude.

With the implementation of FIG. 4, voltage 232 supplied to processing unit 210 may be reduced to a reasonable level that is higher than or equal to the desired voltage (e.g., PSTATE Voltage). Being supplied with the reduced instance of voltage 232, processing unit 210 operates properly, as the reduction is based on maintaining at least a minimum voltage to allow proper operation, and the power consumption also reduces.

In some implementations of the present disclosure, in order to determine a function associated with the range, computer-implemented method 400 determines a target state of processing unit 210 from the voltage identification instruction. Computer implemented method 400 receives a voltage identification instruction to set the magnitude of voltage 232 supplied to processing unit 210. Computer-implemented method 400 determines the function within the range based on the target state (e.g., utilizes the magnitude of voltage 232 from the instruction as the target state and to determine the function). The target state is the determined (e.g., fixed, desired, ideal) value (e.g., goal) associated with processing unit 210 to allow for operation. For example, a target state is the desired value for which computer-implemented method 400 lowers the existing value of voltage 232 to equal, which creates an updated instance of voltage 232.

In the present disclosure, processing unit 210 may work at various predefined target states. As described in the preceding paragraphs, the target state may be associated with a predefined voltage and may be defined by the VID instruction. In the implementations of computer-implemented method 400, a voltage identification instruction such as a PSTATE VID 230 (Voltage Identification) instruction may be received by regulating unit 220. The VID is represented by a number of bits, which facilitate in instructing regulating unit 220 to set the correct supply voltage based on the VID. The VID may include different numbers of bits (such as 5 bits, 6 bits or 8 bits) according to various versions of the specification of the CPU and a target state may be determined from the VID instruction. In this implementation, those skilled in the art may determine the target state according to the various versions of the specification of the CPU. Depending on the specific configuration of processing unit 210, processing unit 210 may work in various target states, and the respective target states may be defined by the respective VID instructions. A plurality of parameters may be specified for the target state, among them the target voltage is an important parameter for defining the working voltage. For example, the PSTATE voltage in FIG. 3 indicates a target voltage of a target state. In another example, processing unit 210 may work at another predefined voltage defined by another VID instruction.

The following paragraphs will describe details of the implementations by taking one state as an example.

In some implementations of the present disclosure, in order for computer-implemented method 400 to determine the function based on the target state and the range, computer-implemented method 400 determines an initial function based on the target state, and in which the initial load line function defines a relationship between a voltage supplied to processing unit 210 and a current of processing unit 210. Further, in another implementation, computer-implemented method 400 determines the function by modifying the initial function based on the range.

Figure 5:
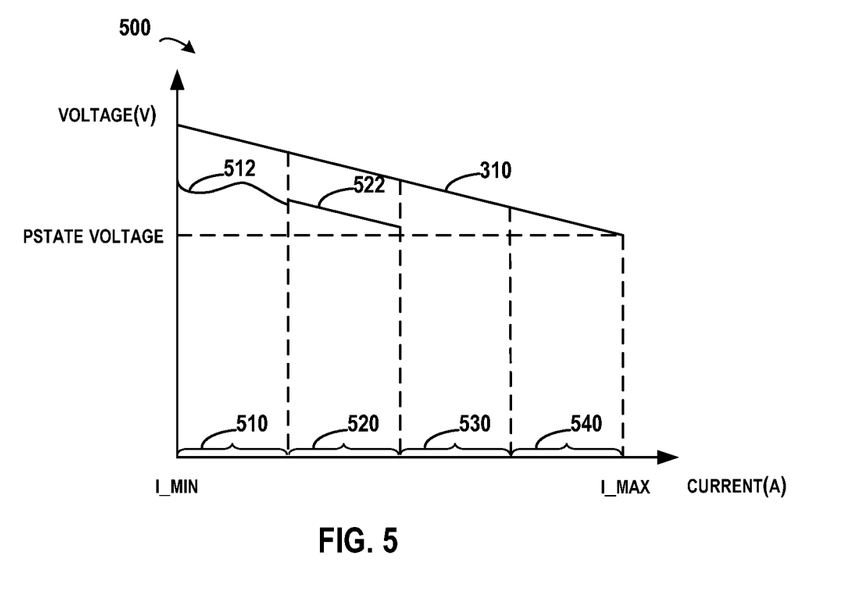
FIG. 5 illustrates example curves of relationships between a voltage that is supplied to the processing unit and a current of the processing unit, in accordance with an embodiment of the present invention.

Computer-implemented method 400 determines the target state of processing unit 210. Computer-implemented method 400 determines an initial function that defines a relationship between voltage 232 supplied to processing unit 210 and a current of processing unit 210. In this implementation, computer-implemented method 400 utilizes the load line function as the initial function, as described is greater detail with respect to FIG. 5, which describes the details of the initial function. FIG. 5 illustrates example curves of relationships between voltage 232 supplied to processing unit 210 and a current of processing unit 210 according to one implementation of the present disclosure within voltage current relationship 500. In FIG. 5, line 310 indicates the initial function, which is fixed according to the load line function of processing unit 210, once the target state is specified.

In some implementations of the present disclosure, in order to determine an initial function based on the target state, computer-implemented method 400 determines a target voltage associated with the target state and a workload parameter associated with processing unit 210. Computer-implemented method 400 determines the initial function based on the determined target voltage and the determined workload parameter. The workload parameter may be represented by the "load line" of processing unit 210, which is an indicator of the relationship between the current and voltage.

In the implementation, computer-implemented method 400 represents the initial function by line 310 with a slope associated with the workload parameter. Line 310 goes through point 320 (I_MAX, PSTATE VOLTAGE), where point 320 indicates that when the current reaches the maximum magnitude of I_MAX, the magnitude of the voltage may equal PSTATE VOLTAGE. In other words, the voltage output to processing unit 210 satisfies the target voltage "PSTATE voltage" when the current of processing unit 210 reaches the maximum magnitude (e.g., I_MAX). Based on the above, computer-implemented method 400 determines the initial function by associating the workload parameter with the slope of line 310. Further, in some implementations, computer-implemented method 400 determines a unique instance of line 310 of the initial function based on the maximum magnitude of the current and the target voltage.

Although FIG. 5 illustrates only one instance of line 310 for one initial function determined from one target state, computer-implemented method 400 may determine another instance of line 310 representing another initial function from another target state. For a specific instance of processing unit 210, the lines of the initial functions show various shapes but with the same slope. For example, the magnitudes of the voltages at the maximum current I_MAX depend on the target state and have different values.

Once computer-implemented method 400 determines the initial function of line 310, computer-implemented method 400 modifies the initial function based on the range in order to obtain the function that defines a desired relationship between the voltage and the current. According to FIG. 5, four ranges 510, 520, 530 and 540 are predefined within the full coverage of the potential current from I_MIN to I_MAX. Although four ranges are illustrated in FIG. 5, the step length for dividing the ranges may be determined according to specific requirements of the implementation. For example, the step length may be shortened or lengthened, to create more or less ranges to provide full coverage from I_MIN to I_MAX. However, as the number of ranges increases, computer-implemented method 400 provides finer granularity (e.g., increased level of detail within the data set). As the size of the ranges decrease, computer-implemented method 400 analyzes smaller portions of line 310, which provides refined results (e.g., increase in accuracy) which results in saving more power. The portion is the segment (e.g., piece) of the function that resides within the range between the initial current and ending current that defines the range. With respect to each instance of ranges 510-540, computer-implemented method 400 obtains a specific function by modifying line 310 of the initial function correspondingly within each instance of ranges 510-540.

In range 510, computer-implemented method 400 determines curve 512 from the portion of line 310 within range 510. Implementations of the present disclosure do not limit the shape of the determined function. For example, the function may show various shapes such as a curve, a line, or another shape, as long as the function facilitates in decreasing the voltage that is supplied to processing unit 210. In the implementation of FIG. 5, computer-implemented method 400 determines the function for range 510 to be curve 512, and computer-implemented method 400 determines the function for range 520 to be line 522.

Although FIG. 5 illustrates only two functions for ranges 510 and 520 respectively, computer-implemented method 400 defines the functions for ranges 530 and 540 in a similar manner. Computer-implemented method 400 modifies the portion of line 310 within ranges 510, 520, 530 and 540 respectively, as long as the determined functions reduce the magnitude of the voltage supplied to processing unit 210. For example, computer-implemented method 400 determines the function for range 530 as a line shape within a trapezoid defined by line 310 and the PSTATE voltage. Computer-implemented method 400 determines the function for range 540 as a curve between line 310 and the dashed line of the PSTATE voltage.

In some implementations of the present disclosure, in order for computer-implemented method 400 to determine the function by modifying the initial function within the range, computer-implemented method 400 modifies the initial function in response to a deviation of a voltage. Computer-implemented method 400 determines the deviation of the voltage according to the initial function and the magnitude of the current from the target voltage, in which the deviation is above a predefined threshold. In other words, computer-implemented method 400 determines that voltage 232 according to the modified initial function and the magnitude of the current is closer to the target voltage.

In these implementations, when computer-implemented method 400 determines voltage 232 based on the current according to the initial function exceeds the target voltage, computer-implemented method 400 determines the determined voltage may be updated by a lower voltage, which is closer to the target voltage. With the updating procedure, computer-implemented method 400 outputs an appropriated voltage to processing unit 210 to reduce the power consumption.

In some implementations of the present disclosure, in order to make the corrected voltage closer to the target voltage, computer-implemented method 400 modifies the initial function such that the deviation (e.g., difference) of voltage 232 from the target voltage is below the predefined threshold. In an implementation, the threshold may be defined according to the specific environment of processing unit 210. In another implementation based on the desired accuracy, the threshold may be set to various values (e.g., lower deviation values result in a higher accuracy than higher deviation value, which result in lower accuracy respectively). In one implementation, the threshold may be set to 0.005 V to obtain a higher accuracy. In another implementation, the threshold may be set to 0.01 V to obtain a lower accuracy.

Figure 6:
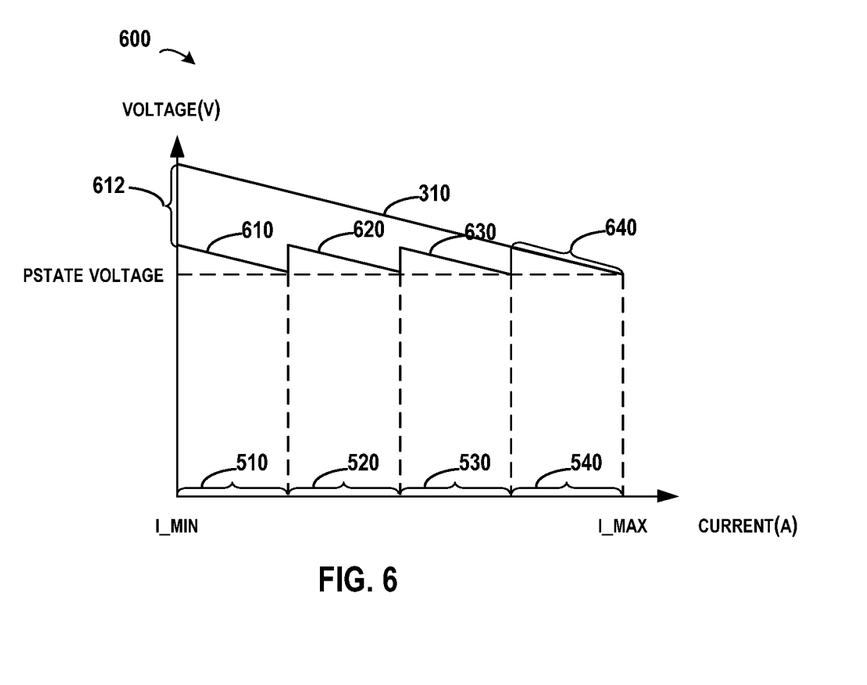
FIG. 6 illustrates example curves of relationships between an updated voltage that is supplied to the processing unit and a current of the processing unit, in accordance with an embodiment of the present invention.

In some implementations of the present disclosure, with respect to a portion of the initial function associated with a magnitude of a current belonging to the range, computer-implemented method 400 determines an offset based on the range and the initial function. Computer-implemented method 400 determines the function by shifting down the portion of the curve, within the range to which the curve belongs, of the initial function by the offset within the range. In these implementations, within each of the ranges, computer-implemented method 400 shifts line 310 down by a corresponding offset. Reference will be made to FIG. 6 to describe how to determine the offset for each range.

FIG. 6 illustrates example curves of relationships between an updated instance of voltage 232 supplied to processing unit 210 and a current of processing unit 210, according to one implementation of the present disclosure within updated voltage current relationship 600. In FIG. 6, range 510 is taken as an example in describing details for determining the offset. Line 610 represents the function of the updated voltage, which computer-implemented method 400 obtains by shifting down line 310 with offset 612. As illustrated in FIG. 6, the full coverage of the potential current from I_MIN to I_MAX is divided into four ranges that are identified as ranges 510-540.

With respect to the range 510 (e.g., first range), the slope of line 610 equals that of line 310 of the initial function. However, the position of line 610 is lower than line 310, thereby ensuring that the updated voltage in line 610 is lowered in order to reduce the power consumption. Meanwhile, the updated voltage in line 610 should be greater than or equal to the target voltage of "PSTATE voltage" in order to ensure the normal operation of processing unit 210. Based on the geometrical relationship in FIG. 6, computer-implemented method 400 determines the value of the offset for each of ranges 510-540. For example, offset 612 may be ¾*(U_MAX−PSTATE voltage), where U_MAX is a voltage that computer-implemented method 400 determines based on the minimum current I_MIN and line 310. Computer-implemented method 400 determines the fraction "¾" by the position of range 510 (the first range in FIG. 6) and the total number of the ranges (four ranges in FIG. 6). Further, computer-implemented method 400 determines the offsets for ranges 520 and 530 to be ²⁄₄*(U_MAX−PSTATE voltage), and ¼*(U_MAX−PSTATE voltage).

It is to be understood that the functions as determined by computer-implemented method 400 for the ranges may have same or different shapes. In one implementation, computer-implemented method 400 determines one function may be a curve, while another function may be a line. In another implementation, computer-implemented method 400 determines all the functions may be curves or lines. In one implementation, computer-implemented method 400 determines the functions for two neighboring ranges may be continuous functions that share the same magnitude of voltage at the boundary between the two ranges. In another implementation, computer-implemented method 400 determines the functions for two neighboring ranges may be discrete functions.

Although FIG. 6 illustrates an implementation where computer-implemented method 400 utilizes four ranges to dynamically control the voltage, in another implementation, computer-implemented method 400 utilizes more or less ranges by dividing the full coverage of the potential current. For example, in another implementation in order to control the voltage precisely, more ranges may be predefined for utilization by computer-implemented method 400. At this point, computer-implemented method 400 determines a corresponding offset based on the number of the ranges, the target voltage, and the slope of the initial function.

Figure 7:
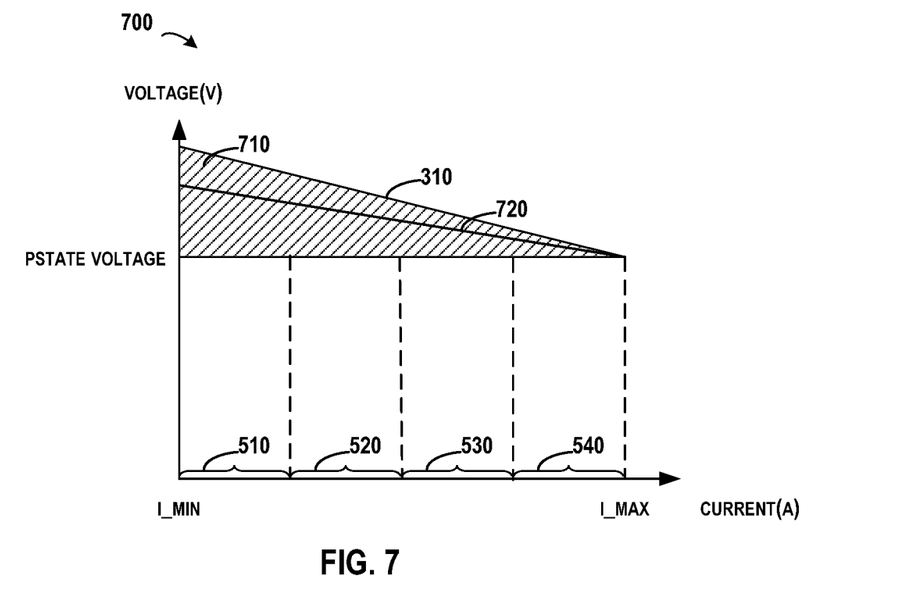
FIG. 7 illustrates an example for generating an updating instruction for updating based on a function associated with the range, in accordance with an embodiment of the present invention.

In some implementations of the present disclosure, the offset may be determined such that a voltage that is determined according to the function (i.e., voltage is within a voltage range), from a voltage that is determined according to the initial function to the target voltage. In other words, computer-implemented method 400 determines the function associated with a voltage range according to the initial function and the target voltage. Computer-implemented method 400 determines the offset (e.g., voltage) as the difference between the voltage of the initial function and the voltage of the determined function within the voltage range. FIG. 7 schematically illustrates an example diagram block 700 for generating an updating instruction for updating line 310 based on a function associated with the range according to one implementation of the present disclosure. In example diagram block 700, Current (A) from I_MIN to I_MAX is split into 4 ranges (e.g., range 510, range 520, range 530, and range 540). Computer-implemented method 400 determines an overall offset as the difference between the maximum voltage of the initial function as defined by line 310 and PSTATE VOLTAGE. Triangle area 710, illustrated in shadow, represents an area in which the shape of the function may reside. Based on the curves of relationships between an updated voltage that is supplied to processing unit 210 and a current of processing unit 210, with the overall offset within the ranges, computer-implemented method 400 determines a second function that defines an update to the voltage. For example, line 720 may be obtained from within triangle area 710 for defining the updated voltage.

Figure 8:
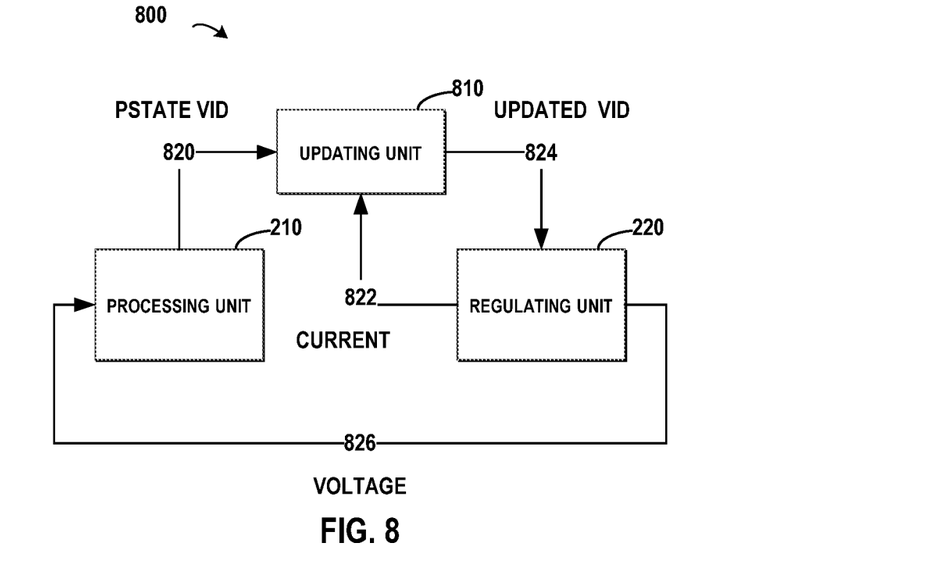
FIG. 8 schematically illustrates an example diagram block of a system for generating an updating instruction for updating based on a function associated with the range, in accordance with an embodiment of the present invention.

FIG. 8 schematically illustrates an example diagram block of dynamic updating voltage control system 800 for generating an updating instruction for updating the voltage identification (e.g., UPDATED VID 824) based on a function associated with the range according to one implementation of the present disclosure. In dynamic updating voltage control system 800, updating unit 810 includes computer-implemented method 400 as described in the preceding paragraphs.

Processing unit 210 is the electronic circuitry within a computer that carries out the instructions of a computer program by performing the basic arithmetic, logical, control and input/output (I/O) operations specified by the instructions. The amount of power processing unit 210 utilizes, is a product of the voltage and the current processing unit 210 draws.

With respect to FIG. 8, regulating unit 220 is a voltage regulator that maintains a constant voltage level that is supplied to processing unit 210 as voltage 826, which also supplies current 822 to updating unit 810. In one embodiment, regulating unit 220 is a separate voltage regulator. In another embodiment, regulating unit 220 is a voltage regulator includes within a power supply which stabilizes voltage 826 utilized by processing unit 210 and other elements (not shown) and current 822 supplied to updating unit 810. Computer-implemented method 400 compares the actual output voltage (e.g., voltage 826) received by processing unit 210 as noted in PSTATE VID 820 to a reference voltage and current pair from (e.g., nominal operating voltage). If computer-implemented method 400 determines the output voltage (e.g., voltage 826) is lower than nominal based on the comparison, then computer-implemented method 400 through updating unit 810 sends regulating unit 220 updated VID 824 to produce a higher output voltage. Conversely, if computer-implemented method 400 determines the output voltage is too low, then computer-implemented method 400 via updating unit 810 sends regulating unit 220 updated VID 824 to produce a lower voltage.

Updating unit 810 is a computing device that includes computer-implemented method 400 for generating an updating instruction for updating the voltage based on a function associated with the range and updating voltage 826 according to one implementation of the present disclosure. Updating unit 810 receives current 822 from regulating unit 220. Additionally, updating unit 810 receives PSTATE VID 820 from processing unit 210. PSTATE VID 820 is the initial PSTATE VID which computer-implemented method 400 calculates as PSTATE VID 820+maximum current*load line. Updating unit 810 utilizes PSTATE VID 820 and current 822 to generate updated VID 824, in which updated VID is PSTATE VID 820+current 822\*load line.

Updating unit 810 receives PSTATE VID 820 from processing unit 210. Computer-implemented method 400 utilizes the received instance of PSTATE VID 820 as a basis for determining the initial function of the relationship between the voltage and the current. Further, via updating unit 810, computer-implemented method 400 receives a magnitude of current 822 from regulating unit 220. With the magnitude of current 822, computer-implemented method 400 within updating unit 810 identifies a range to which the magnitude of current 822 belongs. Further, based on the magnitude of current 822 and the determined initial function, computer-implemented method 400 within updating unit 810 generates an updating instruction (for example, UPDATED VID 824) for updating a magnitude of voltage 826 that is supplied to processing unit 210, and computer-implemented method 400 sends UPDATED VID 824 to regulating unit 220.

Although the above paragraphs describe the implementation with reference to FIG. 8, the operations illustrated by the arrows may occur out of the order described above. For example, updating unit 810 may first obtain the magnitude of current 822 from regulating unit 220, and then obtain PSTATE VID 820. Alternatively, the two operations may be executed substantially concurrently, or in a reverse order.

Figure 9:
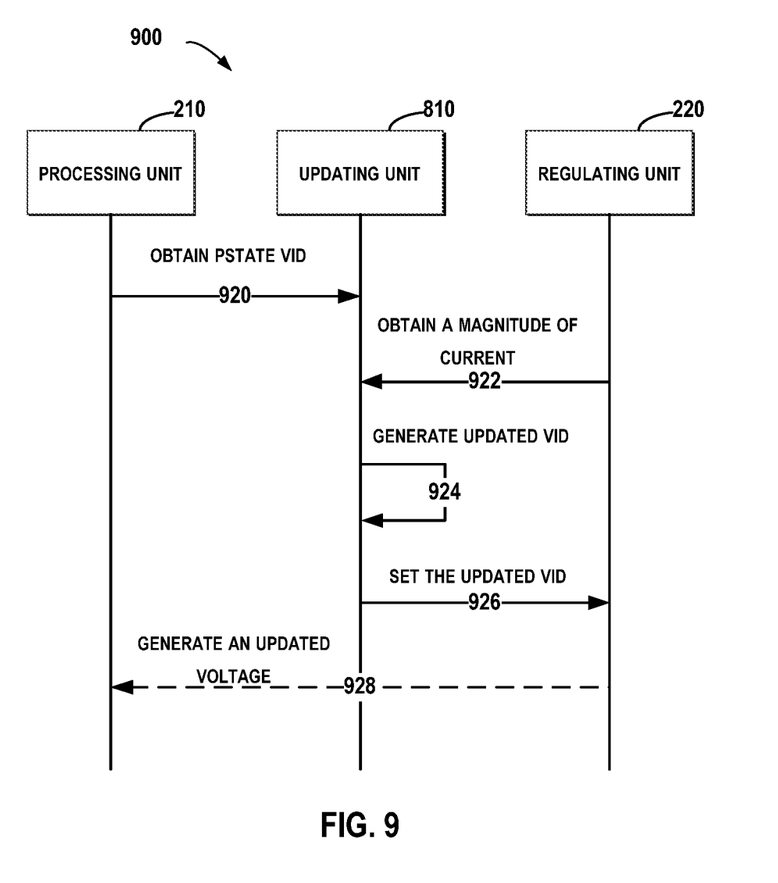
FIG. 9 schematically illustrates an example workflow for generating an updating instruction for updating a magnitude of a voltage that is supplied to the processing unit, in accordance with an embodiment of the present invention.

FIG. 9 schematically illustrates an example workflow 900 for generating an updating instruction (e.g., UPDATED VID 824) for updating a magnitude of voltage 826 that is supplied to processing unit 210 according to one implementation of the present disclosure.

In FIG. 9, in step 920 of example workflow 900, updating unit 810 receives PSTATE VID 820 from processing unit 210. Additionally processing unit 210 provides a maximum associated with current 822. PSTATE VID 820 provides the basis for determining the initial function of the relationship between voltage 826 and current 822. Example workflow 900 generates the initial VID (i.e., initial function) as PSTATE VID 820+maximum current*load line. Upon generation of the initial VID, processing unit 210 sends the initial function to updating unit 810 for further utilization.

In step 922 of example workflow 900, updating unit 810 obtains a magnitude of current 822 from regulating unit 220. By utilizing the obtained magnitude of current 822, updating unit 810 identifies a range to which the magnitude of the current 822 belongs (i.e., the range is a set of output values that includes the identified magnitude of the current). Additionally, updating unit 810 monitors current 822 for changes to occur as a result of regulating unit 220. For example, current 822 increases or decreases in response to changes made through regulating unit 220 upon implementing updated VID 824. If updating unit 810 does not detect a change to current 822, then updating unit 810 continues to monitor current 822 until a change occurs and remains at step 922. If updating unit 810 detects a change in current 822, then updating unit 810 generates updated VID 824 (step 924).

In step 924 of example workflow 900, based on the magnitude of current 822 and the determined initial function, updating unit 810 generates an updating instruction (for example, updated VID 824) for updating a magnitude of voltage 826 that is supplied to processing unit 210. Updated VID 824=PSTATE VID 820+current*load line, wherein the current is the existing value of current 822 (i.e., changes from the maximum value to the actual value.)

In step 926 of example workflow 900, updating unit 810 sends updated VID 824 to regulating unit 220, thereby setting regulating unit 220. In step 928 due to a change that results from updated VID 824, updating unit 810 initiates generation of an update to voltage 826. Responsive to receiving updated VID 824, regulating unit 220 generates an update to voltage 826 (i.e., increase or decreases voltage 826), which regulating unit 220 then send as an output (e.g., supplies) to processing unit 210.

In some implementations of the present disclosure, an updated voltage may be output to processing unit 210 according to the updating instruction (e.g., updated VID 824). Referring to FIG. 9, based on updated VID 824, in step 928 of workflow 900, regulating unit 220 generates an update to voltage 826 and supplies processing unit 210 with an update to voltage 826. With the above implementations, the updating instruction may be generated dynamically (e.g., automatically institutes updates) according to the magnitude of current 822 of processing unit 210, such that voltage 826 that exceeds the desired working voltage may be decreased to a reasonable magnitude in order to enable a power saving mode.

It will be noted that the functions of updating unit 810 may be implemented by computer instructions, special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for controlling voltage, the method comprising:
    obtaining, by one or more computer processors, a magnitude of a current of a processing unit, wherein the current is dynamic;
    determining, by one or more computer processors, whether the magnitude of the current of the processing unit changes in real time, wherein the magnitude of the current changes based on a change to a workload parameter;
    responsive to determining the magnitude of the current of the processing unit changes, identifying, by one or more computer processors, a range that is a set of output values that includes the obtained magnitude of the current;
    dividing, by one or more computer processors, the range into at least a first portion and a second portion;
    determining, by one or more computer processors, a function for each of the first portion and the second portion, wherein the function for each of the first portion and the second portion are non-linear;
    determining, by one or more computer processors, an optimized magnitude of a voltage based on the obtained magnitude of the current and the determined function for each of the first portion and the second portion;
    generating, by one or more computer processors, an updating instruction based on the determined optimized magnitude of the voltage; and
    supplying, by one or more computer processors, the generated updating instruction to the processing unit.

2. The method of claim 1, wherein determining the function for each of the first portion and the second portion further comprises:
    receiving, by one or more computer processors, a voltage identification instruction for setting the magnitude of a voltage supplied to the processing unit;
    determining, by one or more computer processors, a target state of the processing unit based on the received voltage identification instruction;
    determining, by one or more computer processors, an initial function for each of the first portion and the second portion based on the target state, wherein the initial function for each of the first portion and the second portion defines a relationship between the voltage supplied to the processing unit and a current of the processing unit; and
    determining, by one or more computer processors, the function for each of the first portion and the second portion by modifying the initial function for each of the first portion and the second portion within a range for each of the first portion and the second portion, wherein the function is a second function defining an update.

3. The method of claim 2, wherein determining the initial function for each of the first portion and the second portion based on the target state further comprises:
    determining, by one or more computer processors, a target voltage associated with the target state;
    determining, by one or more computer processors, the workload parameter associated with the processing unit; and
    determining, by one or more computer processors, the initial function for each of the first portion and the second portion based on the determined target voltage and the determined workload parameter.

4. The method of claim 2, wherein the determining the function for each of the first portion and the second portion by modifying the initial function for each of the first portion and the second portion within the range for each of the first portion and the second portion further comprises:
    determining, by one or more computer processors, a deviation of a voltage that is a difference of the initial function for each of the first portion and the second portion and the magnitude of the current from a target voltage; and
    determining, by one or more computer processors, whether the determined deviation is above a predefined threshold.

5. The method of claim 4, further comprises:
    responsive to determining, that the determined deviation is above the predefined threshold, reducing, by one or more computer processors, the voltage based on the determined deviation, wherein another deviation of the reduced voltage and the target voltage is below the predefined threshold; and
    modifying, by one or more computer processors, the initial function for each of the first portion and the second portion based on the reduced voltage.

6. The method of claim 2, wherein the determining the function for each of the first portion and the second portion by modifying the initial function for each of the first portion and the second portion within the range for each of the first portion and the second portion further comprises:
    determining, by one or more computer processors, an offset based on the range for each of the first portion and the second portion and the initial function for each of the first portion and the second portion;
    determining, by one or more computer processors, a curve of the initial function for each of the first portion and the second portion; and
    shifting, by one or more computer processors, the determined curve down from the initial for each of the first portion and the second portion function by the offset to determine the function for each of the first portion and the second portion.

* * * * *